US010185961B2

(12) United States Patent
Akin (10) Patent No.: US 10,185,961 B2
(45) Date of Patent: *Jan. 22, 2019

(54) GEOTAGGED IMAGE FOR CHECKING VALIDITY OF PURCHASE TRANSACTION

(71) Applicant: PAYPAL, INC., San Jose, CA (US)

(72) Inventor: Jeremiah Akin, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 15/138,128

(22) Filed: Apr. 25, 2016

(65) Prior Publication Data

US 2016/0239843 A1    Aug. 18, 2016

Related U.S. Application Data

(63) Continuation of application No. 13/843,636, filed on Mar. 15, 2013, now Pat. No. 9,324,075.

(51) Int. Cl.
*G06Q 20/40* (2012.01)
*G06Q 20/20* (2012.01)
*G06F 17/30* (2006.01)
*G06Q 20/32* (2012.01)

(52) U.S. Cl.
CPC ..... *G06Q 20/405* (2013.01); *G06F 17/30259* (2013.01); *G06Q 20/20* (2013.01); *G06Q 20/3224* (2013.01); *G06Q 20/401* (2013.01)

(58) Field of Classification Search
None
See application file for complete search history.

(56) References Cited

U.S. PATENT DOCUMENTS

2012/0185393 A1* 7/2012 Atsmon ............... G06Q 20/10
                                                    705/44
2013/0268378 A1* 10/2013 Yovin ................. G06Q 20/204
                                                    705/18

* cited by examiner

*Primary Examiner* — Paul Danneman
(74) *Attorney, Agent, or Firm* — Haynes & Boone, LLP (57) ABSTRACT

A service provider receives, from a merchant device, a geotagged image of a payment instrument, such as a credit card, provided to the merchant by a buyer for payment. It first determines the validity of the payment instrument using the captured image and then assesses the validity of the claimed purchase transaction by comparing the GPS data in the geotagged image, representing the geotagging location, with a separately transmitted GPS data, representing the location of transmitting the geotagged image. For further assessment, it may further compare the time of geotagging the image with the time of transmitting the image. The service provider then determines on the overall validity of the claimed purchase transaction based on the determination on the validity of the payment instrument and the assessment results, and if it determines the purchase transaction is valid, processes requested payment to the merchant's account.

20 Claims, 4 Drawing Sheets

GEOTAGGED IMAGE FOR CHECKING VALIDITY OF PURCHASE TRANSACTION

CROSS-REFERENCE TO RELATED APPLICATIONS

This application is a continuation of U.S. patent application Ser. No. 13/843,636, filed Mar. 15, 2013, the entirety of which is incorporated herein by reference.

BACKGROUND

Field of the Invention

The present invention generally relates to a field of assessing and determining a validity of a commercial transaction, particularly a purchase transaction.

Related Art

In a credit-based society nowadays, more and more commercial transactions, even in the area of small daily economic activities of the public, are being conducted without using any cash, aiming for a totally cashless society. As the usage of non-cash payment instrument such as credit cards, debit cards, cyber money, or personal checks comes to infiltrate virtually every area in commercial transactions, it is gaining an increased importance to develop a business scheme that makes commercial transactions, such as payment for purchase, easier, faster, and more convenient to both buyers and merchants, while ensuring the security of the transaction against all kinds of frauds that are also becoming more sophisticated and diversified by taking advantage of rapidly developing modem technologies and potential loopholes existing in the business transaction systems.

For making the everyday commercial transaction easier and convenient in that regard, a number of service providers or payment providers, such as PayPal, Inc. of San Jose, Calif., have emerged and been growing up rapidly these days. One of the business schemes developed recently by such payment providers, for instance, PayPal Here™, to facilitate payment transaction allows a merchant who has an account with such a payment provider to accept payments in non-cash forms, such as a credit card or debit card, by using the merchant's mobile phone in which the payment provider's application is installed as a cash register. Generally, there are two ways of processing, for instance, a credit card payment. One way is to use a portable card reader, typically provided from a service provider, which can be easily plugged in to the merchant's mobile phone. When the merchant swipes a credit card received from a buyer into the card reader, the credit card information is transmitted to the payment provider, which instantly checks the validity of the card, processes, if the validity of the card is confirmed, the payment of a charged amount to the merchant's account minus a contracted service fee, and notifies the result, either acceptance or rejection of the credit card payment, to the merchant's mobile phone.

Another way is to use a camera or scanning function typically carried by a mobile phone these days. This method is used typically in a situation where the card reader described above is not available or fails to work for some reason. In this case, the credit card is photographed or scanned by the mobile phone, and the photo or scanned image of the card carrying the credit card information is transmitted to the payment provider for verification. After payment transaction, the photo or scanned image is routinely stored in the merchant's mobile phone for record. This method, however, is vulnerable to a fraud. The mobile phone is frequently lost or stolen. Someone, who unrightfully acquires the merchant's mobile phone and finds all the photos or scanned images stored therein, may disguise as a genuine merchant by setting up her or his own account with the payment provider, and transmit the photos or scanned images, requesting the payment provider to process payment for a bogus purchase transaction. In this situation, the current method of determining the validity of the transaction, which is based only on the transmitted photos or scanned images of a credit card, cannot detect such a fraudulent request.

Therefore, when a merchant uses a payment provider for verifying and processing a non-cash payment instrument from buyers, such as a credit card, via a merchant device, and when the images of the non-cash payment instrument are taken and sent to the payment provider for verification of the validity of the purchase transaction, a need exists to provide a method and system that has an additional measure for checking the validity of the purchase transaction, in addition to the present way of relying solely on the transmitted images of the non-cash payment instrument, which is, as described above, vulnerable to a fraud.

DETAILED DESCRIPTION

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

Figure 1:
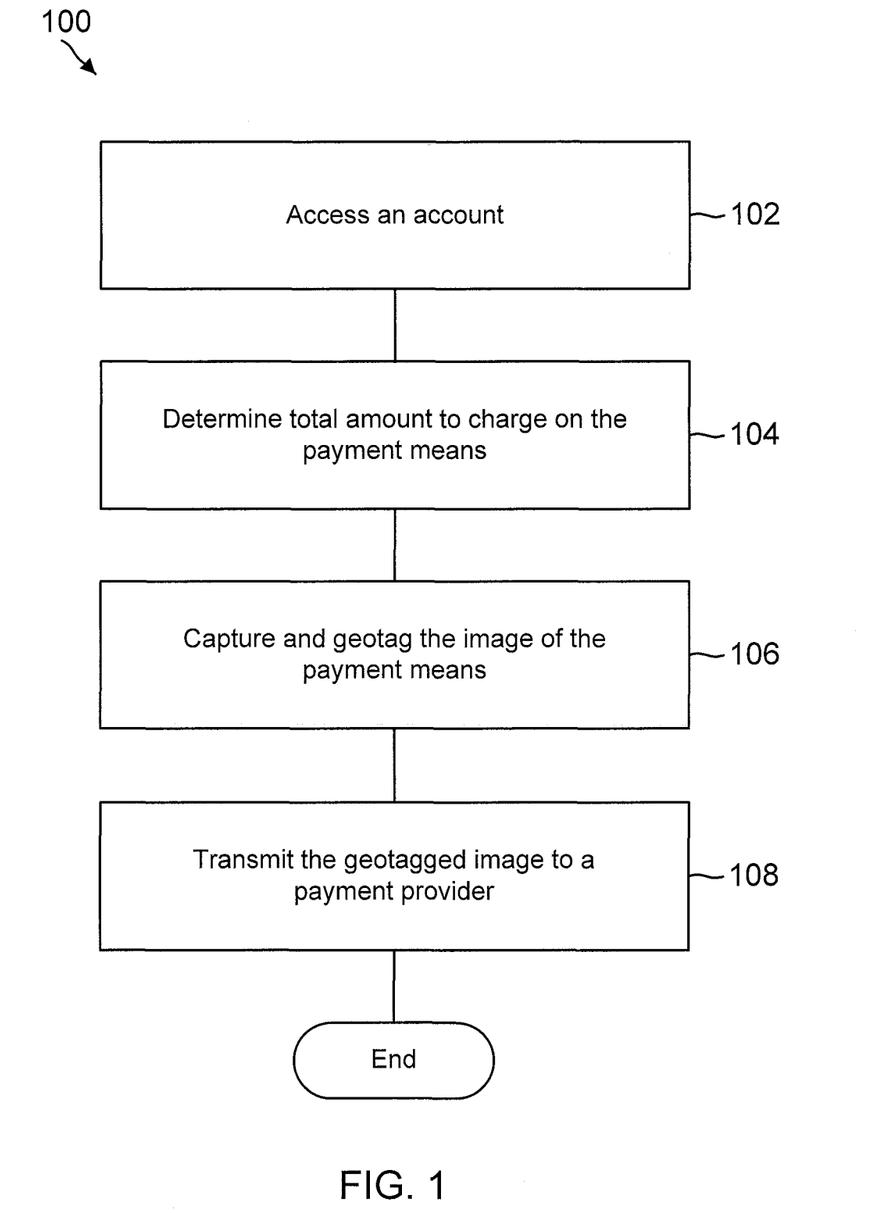
FIG. 1 is a flowchart showing a process a user/merchant performs in making a payment request to a payment provider, according to one embodiment.

FIG. 1 is a flowchart showing a process 100 a user performs, according to one embodiment, in making a payment request to a service or payment provider (hereinafter "payment provider"), such as PayPal, Inc. of San Jose, Calif., with whom the user has an account for processing a payment transaction, including verifying the validity of a non-cash payment instrument used for payment for a purchase transaction involving the user at a point of sale (POS), and processing the payment. In one embodiment, the user may be a merchant such as a manufacturer, distributor, or retailer of any products or services. In another embodiment, the user may a consumer/buyer who is making a purchase from a merchant The user previously has set up an account with the payment provider by entering all required user information. During the set up procedure, the payment provider may allow the user to configure the user's account. For instance, if the user is a merchant, the payment provider may give the merchant a complete control over how the merchant displays business information to the buyers on a merchant device, itemizes sales information, calculates sales tax, offers discounts, accepts tips, or adds other users to the merchant's account.

At step 102, the user accesses an account with the payment provider through a user device, such as a server, PC, tablet, iPad, mobile phone or other suitable device that has a capability of wireless communication with the payment provider. The user device, which is either merchant device or buyer device depending on who the user is, also has a capability of capturing an image to a digital form via a scanner such as Zxing or any other suitable one, or by a camera installed therein. The user device further has a capability of geotagging images at the time of capture thereof, which will be described further herein below. The user device has one or more user application(s) installed therein for performing such capturing and geotagging images, transmitting the captured digital images to the payment provider, allowing the user to access the account, and a series of other tasks in regard with the process 100. The user application(s) may have been developed and provided by the payment provider or by a third party. Accessing the account may include entering any requested identification and/or authentication information, such as a user name, email address, name, phone number, password, PIN, pass code, etc., onto a field via a device keyboard or keypad, or speaking the identifier into a device microphone. Once the user has been authenticated, the user may be directed to a home screen of the payment provider or the user account.

At step 104, the user determines the total amount to be charged to a payment instrument for the purchase transaction. In an embodiment in which the user is a merchant, on the screen of the merchant device, there may be an option to enter a total sale price for the product(s) or service(s) sold to a buyer. The option may be presented as a tab, button, or link, which the merchant may choose by tapping or clicking on it through a suitable entry means such as a touch screen, touchpad or mouse of the merchant device. Then the application may pop up a window for the merchant to enter the number for the price, again by a suitable entry means. Then the user application may allow the merchant to add a sales tax on the sale price. The sales tax rate, which is usually fixed in a given state, may have been preset by the merchant at the time of the initial account setup, and the tax may be automatically calculated by the user program as to the sale price and added thereto just by merchant's clicking on a button that reads as, for instance, "tax." Or, the merchant may manually enter the tax rate by using, for instance, a number keypad.

In an embodiment, the application may also allow the merchant to apply any discount to the sale price. The amount or percentage rate of a discount also may have been predetermined so that a simple touch of a button or tab that reads as "discount" may automatically deduct the preset amount of discount from the sales price. The discount option may be activated, in an embodiment, only when a code, such as a promotion code provided from the customer/buyer, is provided. Or, the amount of discount may be selected out of a scroll menu or typed in by the merchant. In an embodiment, there may be a further option, before determining the total amount to be charged, to enter a tip determined by a customer/buyer who received a service from the merchant by tapping or clicking on a button or tab named 'tip.' The amount of tip may be either automatically calculated by the user application from a buyer-determined percentage that is either chosen from a scroll menu or manually entered using a keypad, or directly typed into a field by the customer/buyer or merchant on the merchant's device. The amount of discount, if any, is subtracted from the total amount to be charged and the amount of tip, if any, is added thereto.

In an embodiment, in which the user is a customer or a buyer and the request for payment from the payment instrument is transmitted from the buyer's device, the user may be informed from the merchant of the total amount to be charged on the payment instrument and enter it in a field popped up by a user application that is running on the buyer device.

Once the total amount to be charged on the payment instrument is determined, then at step 106, the user, either a merchant or a buyer, takes a capture, on the corresponding merchant or buyer device, of a geotagged image of a payment instrument provided by the buyer for payment. The payment instrument could be any non-cash physical instruments or objects used in commercial transaction, including, but not limited to, a credit card, debit card, charge card, store-value card, payment provider card, fleet card, or personal or business check. The image should be captured in such a way to bear all necessary information printed on the payment instrument, such as the names of the card holder and card issuer, card number, and expiration date would suffice, which is required for verifying the validity of the payment instrument and processing payment transaction by the payment provider if the validity is verified.

The image of the payment instrument can be captured by the merchant or buyer device in the form of either an electronic photo image taken by a digital camera or a scanned image taken by a scanner, such as Zxing or any other suitable one, installed at the device. The digital camera or scanning function of the device may be associated with and invoked by the user application.

Furthermore, the image is geotagged at the time of capture by the merchant or buyer device. Geotagging is a process of adding geographical identification metadata representing a particular position or location to various media such as a geotagged photograph or video, websites, SMS messages, QR Codes or RSS feeds, and is a form of geospatial metadata. This data, typically called GPS data because they are derived from the global positioning system (GPS), consist of latitude and longitude coordinates in units of degrees with decimals that present each location on the earth from 180° west through 180° east along the Equator and 90° north through 90° south along the prime meridian. But the data can also include altitude, bearing, distance, accuracy data, and place names. In the present case, the GPS data geotagged into the image presents the location of the point of sale (POS), or equivalently, the location of the payment instrument at the time it is being captured. In order to obtain GPS data, the digital camera or scanner in the merchant device may have a built-in GPS or a standalone GPS connected thereto. Most smart phones used these days utilize a GPS chip along with built-in cameras or scanners to allow users to automatically geotagged photos. The geotagging of the GPS information, that is, embedding the GPS information with the photo or scanned image may be done either by the user application or by a separate geotagging application installed at the device. For instance, if photos or scanned images are stored in JPEG file format, the typical the metadata for the geotag information are embedded therein in an exchangeable image file format (EXIF) or an extensible metadata platform (XMP) format. These data are not visible in the picture itself but are read and written by special programs such as the cross-platform open source ExifTool.

In one embodiment, the geotagged image may further include the time information, the hour and minute, date, month, and the year, of the time of capturing the image of the payment instrument by a digital camera or scanner. Just as the GPS data, the time information may be coded into the digital image in the form of metadata.

Now, referring back to FIG. 1, finally at step 108, the geotagged image is wirelessly transmitted, together with the total amount to be charged to the particular payment instrument in an embodiment, to the payment provider from either the merchant device or buyer device for having the payment provider verify the validity or authenticity of the payment instrument utilizing the geotagged image, and if it is verified, process the payment. If the geotagged image and the total amount is transmitted from a buyer device, an identifier of the merchant's account, received from the merchant, is transmitted from the buyer device so that the payment provider may access and credit the merchant's account with the total amount of charge minus some contracted service fee. The transmission is made by the user application via the wireless communication capability of the device. In an embodiment, a final confirmation of all information to be transmitted may be required either by the merchant or buyer by, for example, tapping or clicking on a tab, button, or link on the user application screen of the merchant or buyer device. After transmission, the geotagged image is typically saved in a memory of the device automatically by the user application for record and future reference.

Figure 2:
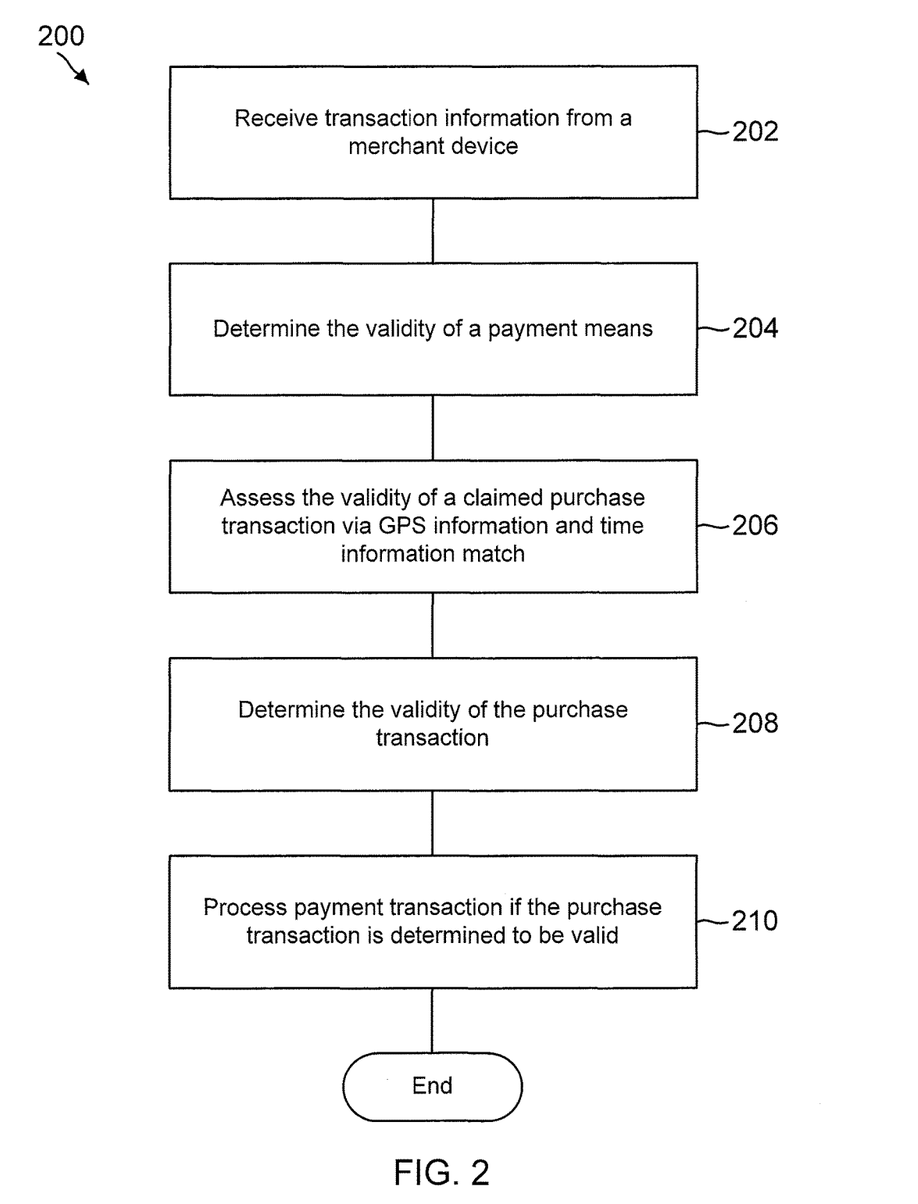
FIG. 2 is a flowchart showing a process a payment provider performs in processing a payment request received from a user/merchant, including steps of verifying the validity of a payment instrument and claimed purchase transaction, according to one embodiment.

FIG. 2 is a flowchart showing a process 200 a payment provider, such as PayPal, Inc. of San Jose, Calif., performs in processing a payment request received from a user, including steps of verifying the validity of a payment instrument and claimed purchase transaction, according to one embodiment. If the payment instrument is verified, the payment provider processes the requested payment transaction. The user has previously set up an account with the payment provider. If the user is a merchant, all business information such as name and address of the business, account identification information, contact information, advertisement or other business information to be displayed to the public, and other preferences may have been entered. Before the steps of the process 200, the account of the user is accessed from a user device in accordance with the procedure described in detail in step 102 of the process 100 in FIG. 1. The user device is any suitable device that has a capability of wireless communication with the payment provider, a digital camera or a scanner, and a GPS chip or a standalone GPS connected thereto. The user device includes, but is not limited to, a PC, tablet, iPad, mobile phone. The user device has a user application installed therein that allows the user to set up and access the account and perform a series of actions in accordance with the steps of the process 100. The user application may be also capable of geotagging an image at the time of capture thereof. The user application may be developed either by the payment provider or by a third party. The user application is provided to the user usually free of charge when the merchant opens an account. It may be downloaded from the payment provider's web site and installed on the user device.

Now referring to FIG. 2, at step 202, the payment provider receives transaction information from the user through the user device for a purchase transaction involving the user, who could be either a merchant or a customer/buyer. The transaction information includes a geotagged image of a payment instrument of a customer/buyer proffered as a payment for purchasing the merchant's product(s) or service(s). The transaction information further includes a second, separate GPS information of the location of the user device at the time of transmitting the transaction information.

The payment instrument could be any non-cash physical means or objects used in commercial transaction, such as a credit card, a debit card, a charge card, a store-value card, service or payment provider card, a fleet card, or even a personal or business check. The captured image of the payment instrument includes all information borne on the payment instrument necessary for performing validity verification and payment transaction by the payment provider. For example, if the payment instrument is a credit card, a photo or scanned image of the front side of the card bearing the names of the card holder and card issuer, card number, and expiration date would suffice.

The image of the payment instrument is captured by the user device using a digital camera or scanner equipped in the merchant device. At the time of the capture, the image is geotagged either by a GPS chip contained in the user device or by a standalone GPS connected thereto, with aid of a suitable application installed in the merchant device. In an embodiment, the user application on the user device can perform the capturing and geotagging of the image while coupled with the camera or scanner, and the GPS functionality In an embodiment, the geotagged image may include first global positioning system (GPS) information of the location of the payment instrument, comprising latitude/longitude coordinates in degrees and decimals, when the image was captured. The detailed procedure and method of capturing and geotagging the image of the payment instrument have been previously described at step 106 of the process 100 in FIG. 1, and thus, not described herein further.

In an embodiment, the transaction information transmitted to and received by the payment provider may further comprise a total amount of purchase charge to be paid via the payment instrument of the customer/buyer. The total amount of purchase charge may include the purchase price of the merchant's product(s) or service(s), a state, local, or any other applicable tax, a possible discount by the merchant, and a tip determined by the customer/buyer. The detailed procedure and method of determining the total amount of charge have been previously described at step 104 of the process 100 in FIG. 1, and thus, not described herein further.

In one embodiment, the transaction information transmitted to and received by the payment provider may further comprise time information, in hour, minute and second, date, month, and the year, of the time of capturing the image of the payment instrument by a digital camera or scanner. Just as the GPS data in the geotagged image, the time information may be coded into the digital image in the form of metadata.

After receiving the transaction information and the second GPS information transmitted from the user device, then at step 204, the payment provider determines the validity of the payment instrument used for the purchase transaction, via the transmitted image included in the transaction information. The validity of the payment instrument is determined from the information on the payment instrument included in the image, such as the names of the card holder and card issuer, card number, and expiration date if the payment instrument is a credit or debit card, and the names of the account holder and the account carrier, account number, account carrier's identification number, account holder's signature and dates if the payment instrument is a check. The payment provider may check the validity or authenticity of the payment instrument on its own or through a third party service provider contracted with the payment provider. The way of determining the validity or authenticity of the payment instrument from the information carried by the payment instrument is well known in the art, and therefore not described herein further.

Continuing to refer to FIG. 2, now at step 206, the payment provider assesses the validity of the purchase transaction via a match between the GPS information included in the geotagged image and the second GPS information received at step 202. As noted before, merely checking the validity of a payment instrument may not enough to ensure the validity of the claimed purchase transaction. For instance, in the afore-described example of a fraud using misappropriated photo or scanned image of a payment instrument, the claimed purchase transaction is obviously fraudulent even if the payment instrument itself is valid. The assessment at step 206 can prevent such a fraud against the payment provider and adds up additional security to the whole purchase transaction that is claimed, and consequently, ensures the validity of the payment transaction requested to the payment provider.

In a normal situation of a purchase transaction, the GPS information embedded in the geotagged image would be identical with the second GPS information transmitted from the user device because in most real situations of a purchase transaction occurring at a merchant's offline store or market, the capturing and geotagging of an image of a payment instrument and transmitting the geotagged imaged from a user device, such as a smart phone, occur at the same location, the point of sale (POS), with virtually little time interval between the two events. For instance, in a typical situation a buyer provides, say, a credit card to the merchant for payment after a purchase of the merchant's product(s) or service(s). The merchant determines a total amount to be charged to the credit card, including applicable tax(es), potential discount or tip, which is entered on a smart phone of either the merchant or buyer. On the smart phone, a user application is already loaded to enable the user logged in to her or his account with the payment provider and request payment transaction. The user, either the merchant or the buyer, then photographs or scans the credit card with her or his smart phone, at which time a geotagging of the image of the credit card is performed to embed, into the image, the GPS information of the location of the credit card at the instant. Immediately after that, or a few more seconds after that might have been taken for obtaining a buyer's final confirmation on the total amount of charge displayed on the smart phone, the geotagged image and the second GPS information of the location of the smart phone are transmitted simultaneously from the smart phone to the payment provider. In such a typical situation, the GPS data embedded in the geotagged image and the second GPS data or information are bound to be exactly the same. Also in that situation, there would be little time difference, at most seconds, between the time when the image is geotagged and the time when the geotagged image is transmitted from the merchant device. Therefore, any difference in the GPS information (i.e., in location) and in time between the two events, geotagging the image and transmitting the geotagged image, would result only when the image of the buyer's credit card, captured and geotagged at the POS with the smart phone, is somehow transmitted to the payment provider at a later time from a different place that is far enough from the POS to have different GPS data. As noted previously, however, there is a situation where a discrepancy in the two GPS information can happen. A loss, misplacement, or theft of a smart phone, for instance, has become almost daily experience people see, hear, or personally have these. Especially, due to the fair economic value of smart phones nowadays, theft of smart phone frequently happens. If a merchant or a buyer conducts the aforementioned purchase and payment transactions with the payment provider by transmitting only photographed or scanned images of payment instrument, and later loses her or his smart phone or has it stolen, the smart phone will contain all the digital images of payment instrument of customers/buyers. And the digital images stored in the smart phone may be used as an instrument of a fraud by whoever acquires the lost or stolen smart phone and decides to commit a fraud against the payment provider.

For example, the wrongful owner of the smart phone may temporarily open and set up a bogus merchant account with the payment provider and request the payment provider for payments to her or his bogus account by transmitting the digital images, disguising them to be from genuine purchase transactions. Therefore, if checking the validity of a credit card and the occurrence of a genuine purchase transaction relies only on the financial information contained in the transmitted digital images, there is no way of discovering that such a request is a fraudulent one. However, if it is required that the captured images of the payment instrument be geotagged also and transmitted to the payment provider together with the present GPS information of the transmitting device for verification and request for payment, the particular type of a fraud described above can be prevented by comparing the two pieces of GPS information, one for the location of the device at the time of transmitting the geotagged images, and the other for the location of the capture and geotagging of the image. In the particular situation of a fraud described above, the two GPS information would be, obviously, different.

Therefore, at step 206, the payment provider can assess the validity of the purchase transaction by comparing the two pieces of GPS information, one, embedded in a geotagged image telling the location of a payment instrument at the time of capture and geotagging, and the other, telling the location of the transmitting device at the time of transmission. If they match, such a result may be an additional evidence for the validity of the claimed purchase transaction. If the two do not match each other, the payment provider still may not be able to instantly make a conclusion of a fraudulent transaction solely from such a discrepancy in itself, but it can have at least a red flag raised upon the validity or authenticity of the claimed purchase transaction, and may hold payment to the merchant's account until a further investigation with other suitable means confirms the validity or authenticity. In that sense, the assessment at step 206 operates as another security layer for ensuring the validity of a claimed purchase transaction and preventing a potential fraud against the payment provider.

In one embodiment, at step 206, the payment provider may further assess the validity of the claimed purchase transaction by comparing not only the two pieces of GPS information transmitted, but also the two time information received by the payment provider. One is the time of capturing and geotagging the image of a payment instrument, which is also embedded, in an embodiment, in the geotagged image, and the other is the time of receiving the geotagged image by the payment provider. As described above, in a typical normal situation of a purchase transaction occurring at a merchant's place, there would be no or little time difference between the two time information because the two events represented by the respective time information would occur almost simultaneously with little time interval. But in the particular situation of a fraud, again described above, the transmission of a geotagged image to the payment provider by a wrongful claimant of payment, who misappropriated the geotagged image from a lost or stolen user device, would happen at a considerably later time than the time when the image was initially captured and geotagged. By analyzing the time difference, if any, between the two pieces of time information, the payment provider can obtain a still further assessment on the validity or authenticity of a claimed purchase transaction.

Still referring to FIG. 2, now at step 208, the payment provider determines the validity of the claimed purchase transaction. Typically, the overall determination at step 208 may be made, automatically and instantly, by a computing system of the payment provider according to a predetermined algorithm. In making the determination, the payment provider may or may not obtain an aid of an external service provider. The determination at step 208 is made in consideration, as a whole, of various factors including the determination on the validity of the particular payment instrument made at step 204 and the assessment results on the validity of the purchase transaction made at step 206. For example, if it is determined at step 204 that the particular payment instrument is not valid for various reasons such as invalid or wrong account number, account holder's name or addresses, expiration of an effective date, maxed out account limit or insufficient funds, then it will be immediately determined at step 208, without having to consider the assessment made at step 206, that the entire purchase transaction is invalid and the payment provider will reject processing the requested payment transaction and notify the user of the rejection. The merchant will accordingly refuse to accept payment instrument offered by the customer/buyer for payment. If the particular payment instrument is determined to be valid, then the assessment results obtained at step 206 is considered. If the two pieces of GPS information and time information, representing respectively the location and time of two events: capturing/geotagging the image of the payment instrument and transmitting the geotagged image, match each other, then it is highly likely that the claimed purchase transaction is genuine and valid, involving no fraud. The payment provider may immediately process the requested payment transaction, i.e., credit the merchant's designated account with the total amount of purchase transaction that is chargeable to the particular payment instrument minus a contracted service fee, and notify the completion of such process to the user on the user device. If the two pieces of GPS information do not match each other, which means the geotagged image of the payment instrument has been transmitted from a different location from that of capturing/geotagging the same image, the payment provider may determine at step 208 that the claimed purchase transaction is highly suspicious of a fraud and thus invalid, and reject processing the requested payment transaction and notify the user. In this particular situation, the two pieces of time information would be logically different.

If, however, the two pieces of GPS information match each other but the two pieces of time information do not, this assessment result may signifies that the payment instrument has been captured and geotagged and somehow the geotagged image was transmitted to the payment provider to request processing payment transaction at a later time for some unknown reason, either at the POS where the image was originally geotagged or at a location close enough thereto to produce same GPS data. This situation will raise a red flag to the payment provider about the genuineness of the claimed purchase transaction and require further evaluation before the payment provider reaches determination of the overall validity of the claimed purchase transaction. The payment provider may evaluate, in an embodiment, the validity of the claimed transaction by further looking at the magnitude of the time difference. For instance, if the time difference between the two events of transmitting and geotagging the image of the payment instrument is bigger than a certain preset value of time, the payment provider may determine that the claimed purchase transaction is suspicious enough to warrant rejection of processing the requested payment transaction. But if the time difference is smaller than the preset value, like a few minutes for example, the payment provider may determine that such time difference could arise from certain plausible situations of a genuine purchase transaction. For example, such situations may occur when the merchant device needs to be fixed from some momentary malfunction after geotagging but before transmitting, the image of a credit card. Or, the total amount to be charged to the credit card may need to be changed on the merchant device, again after geotagging a credit card but before, for example, tapping or clicking on the 'transmit' or 'confirmation' tab or button to transmit the geotagged image, because the customer/buyer in the meantime decided to add/drop some item(s) in the purchase list, or provided a coupon after entry of the initial total amount, or raised an appeal after finding an error in the total amount, and so on. In these situations, the payment provider may either approve the requested payment transaction in an embodiment if the time difference is short enough, or in another embodiment, suspend the instantaneous approval and demand additional suitable evidence supporting the genuineness of the claimed purchase transaction.

Lastly, at step 210, the payment provider may process a payment to the merchant's account on a positive determination on the validity of the purchase transaction at step 208. When the geotagged image of a payment instrument is wirelessly transmitted to the payment provider, such transmission constitutes a request to the payment provider for processing the payment upon a positive determination on the validity of the purchase transaction. After completion of such processing, the merchant's account is credited by the total amount that is charged on the payment instrument minus any applicable contracted fee for the service of the payment provider. Whether the payment provider approves or rejects such request in accordance with the determination made at step 208, the payment provider may further communicates the approval or rejection to the user on the user's device.

Figure 3:
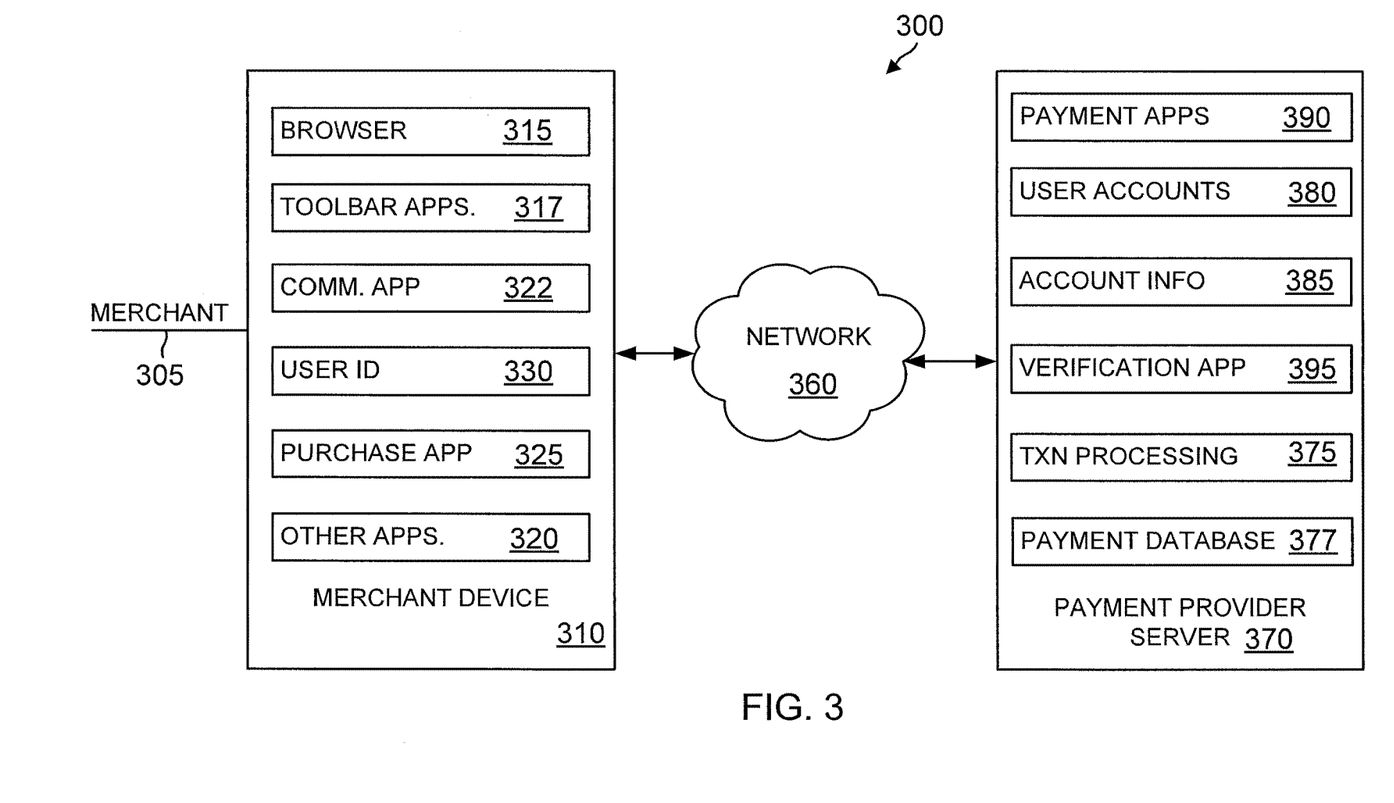
FIG. 3 is block diagram of a networked system suitable for implementing the process described herein according to an embodiment.

FIG. 3 is a block diagram of a networked system 300 configured to handle a transaction, such as described above, in accordance with an embodiment of the invention. System 300 includes a user device 310 and a payment provider server 370 in communication over a network 360. Payment provider server 370 may be maintained by a payment provider, such as PayPal, Inc. of San Jose, Calif. A user 305 utilizes the user device 310 to request to the payment provider server 370 a processing of payment transaction for a purchase transaction involving the user 305, who may be either a merchant or her or his customer/buyer. Note that transaction, as used herein, refers to any suitable action performed using the user device 310, including payments, transfer of information, display of information, etc. Although only one merchant device is shown, a plurality of user devices may be utilized if there are multiple users having accounts with the payment provider.

The user device 310 and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

The network 360 may be implemented as a single network or a combination of multiple networks. For example, in various embodiments, network 360 may include the Internet or one or more intranets, landline networks, wireless networks, and/or other appropriate types of networks.

The user device 310 may be implemented using any appropriate hardware and software configured for wired and/or wireless communication over network 360. For example, in one embodiment, the user device 310 may be implemented as a personal computer (PC), a smart phone, personal digital assistant (PDA), laptop computer, tablet, and/or other types of computing devices capable of transmitting and/or receiving data, such as an iPad™ from Apple™.

The user device 310 may include one or more browser applications 315 which may be used, for example, to provide a convenient interface to permit the user 305 to browse information available over network 360. For example, in one embodiment, browser application 315 may be implemented as a web browser configured to view information available over the Internet, and/or access merchant sites for viewing and purchasing commercial products. The user device 310 may also include one or more toolbar applications 317 which may be used, for example, to provide client-side processing for performing desired tasks in response to operations selected by the user 305. In one embodiment, the toolbar application 317 may display a user interface in connection with the browser application 315 as further described herein.

The user device 310 may further include a purchase application 325 by which the user 305 may transmit a geotagged image of a payment instrument for paying for the products or services purchased, and concurrently, a payment request to the payment provider server 370 via network 360. The purchase application 325 may be incorporated into the browser 315 in one embodiment. Further, the purchase application 325 may have an image capturing function to scan/photograph, through a scanner or camera in the user device 310, a payment instrument to obtain a digital image, and further, to geotag the digital image.

The user device 310 may further include other applications 320 as may be desired in particular embodiments to provide desired features to user device 310. For example, other applications 320 may include security applications for implementing client-side security features, programmatic client applications for interfacing with appropriate application programming interfaces (APIs) over network 360, or other types of applications. The applications 320 may also include email, texting, voice and IM applications that allow the user 305 to send and receive emails, calls, and texts through network 360, as well as applications that enable the user 305 to communicate, transfer information, and make payments. The user device 310 includes one or more user identifiers 330 which may be implemented, for example, as operating system registry entries, cookies associated with browser application 315, identifiers associated with hardware of the user device 310, or other appropriate identifiers, such as used for payment/user/device authentication. In one embodiment, user identifier 330 may be used by a payment provider to associate the user 305 with a particular account maintained by the payment provider as further described herein. A communications application 322, with associated interfaces, enables the user device 310 to communicate within system 300.

The payment provider server 370 may be maintained, for example, by an online payment service provider which may provide payment to the user 305. The payment provider server 370 also maintains a plurality of user accounts 380, each of which may include account information 385 associated with individual users. For example, account information 385 may include private financial information of users such as account numbers, passwords, device identifiers, user names, phone numbers, credit card information, bank information, or other financial information, and shipping information which may be used to facilitate online transactions by the user 305.

The payment provider server 370 includes one or more payment applications 390 which may be configured to interact with the user device 310 over network 360 to facilitate the purchase and payment transactions and receive/transmit information, as described in the process 200 in FIG. 2. Specifically, the payment application 390 is configured to receive transaction information transmitted from the user device 310 for a purchase transaction that occurred between the user 305 and a customer/buyer, which comprises a geotagged image and the total amount to be paid by the payment instrument.

The payment provider server 370 may further include a purchase transaction verification application 395, which may be included in, or separate from the payment application 390. The purchase transaction verification application 395, on receipt of the geotagged images via the payment application 390, determines, based on the image information derived from the geotagged image, whether the payment instrument is valid, and further assesses, by comparing the GPS information and time information, derived respectively from the geotagged images and transmissions from the user device 310, the validity of the claimed purchase transaction. Further, the purchase transaction verification application 395 determines, based on the validity of the payment instrument and assessment results of the validity of the claimed purchase transaction it obtained, whether the claimed purchase transaction is overall valid. For the determination on the validity of the payment instrument, the purchase transaction verification application 395 may be associated with an external service provider and obtain assistance therefrom.

The payment provider server 370 may further include a transaction processing application 375, configured to process the payment request from the user device 310 upon the verification of the claimed purchase transaction via the purchase transaction verification application 395 and store the transaction in a payment database 377.

Figure 4:
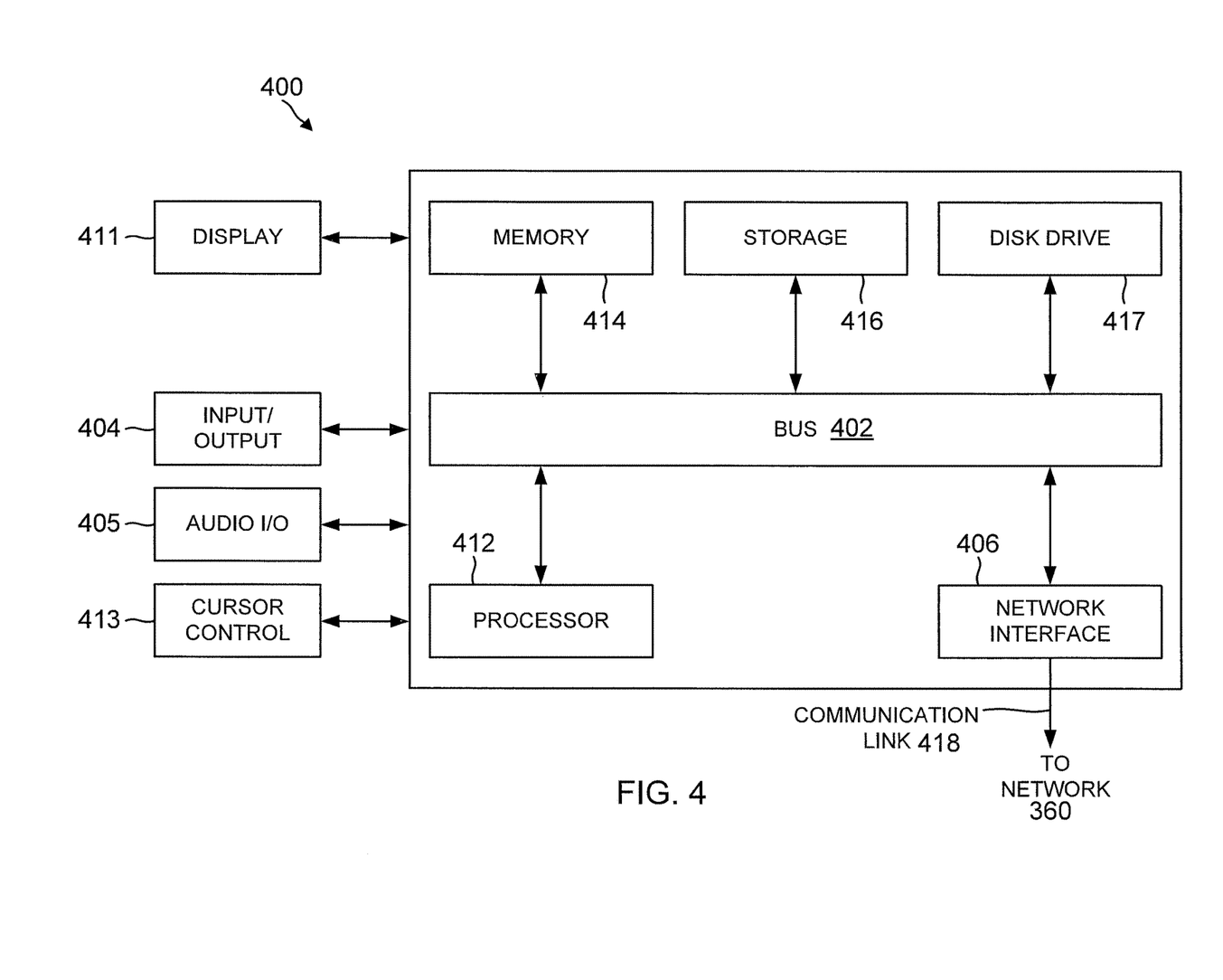
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows:

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to perform operations comprising
      receiving an image of a payment instrument for a user, wherein the image comprises metadata for the image;
      determining a geo-location of a user device for the user at a first time associated with capture of the image;
      determining a second time associated with use of the image as the payment instrument;
      determining that a difference between the second time and the first time matches a predetermined time difference value for allowable use of the payment instrument based on the metadata and the second time; and
      assessing a validity of the use of the image as the payment instrument based on the metadata for the image and the geo-location.

2. The system of claim 1, wherein the image is received from a merchant device for a merchant for a transaction with the user, and wherein the merchant is paid for the transaction with the user by the payment instrument.

3. The system of claim 2, wherein the merchant device comprises a point-of-sale device, and wherein the metadata comprises a location for one of the merchant and the point-of-sale device.

4. The system of claim 1, wherein the user is a first user, wherein the image is received from a second user, and wherein the second user receives a payment from the first user for one of a transfer and a transaction using the payment instrument.

5. The system of claim 1, wherein the user device comprises a smart phone.

6. The system of claim 1, wherein the metadata comprises a location where the image was captured.

7. The system of claim 1, wherein the metadata comprises the first time associated with capture of the image.

8. The system of claim 1, wherein receiving the image of the payment instrument for the user comprises receiving transaction information comprising the image, and wherein the transaction information indicates a location where the image was captured.

9. The system of claim 1, wherein the geo-location comprises global positioning system (GPS) data.

10. The system of claim 1, wherein the payment instrument is one of a credit card, a debit card, a payment provider card, or a check.

11. A method comprising:
receiving an image of a payment instrument for a user, wherein the image comprises metadata for the image;
determining a geo-location of a user device for the user at a first time associated with capture of the image;
determining a second time associated with use of the image as the payment instrument;
determining that a difference between the second time and the first time matches a predetermined time difference value for allowable use of the payment instrument based on the metadata and the second time; and
assessing a validity of the use of the image as the payment instrument based on the metadata for the image and the geo-location.

12. The method of claim 11, wherein the image is received from a merchant device for a merchant for a transaction with the user, and wherein the merchant is paid for the transaction with the user by the payment instrument.

13. The method of claim 12, wherein the merchant device comprises a point-of-sale device, and wherein the metadata comprises a location for one of the merchant and the point-of-sale device.

14. The method of claim 11, wherein the user is a first user, wherein the image is received from a second user, and wherein the second user receives a payment from the first user for one of a transfer and a transaction using the payment instrument.

15. The method of claim 11, wherein the user device comprises a smart phone.

16. The method of claim 11, wherein the metadata comprises a location where the image was captured.

17. The method of claim 11, wherein the metadata comprises the first time associated with capture of the image.

18. The method of claim 11, wherein receiving the image of the payment instrument for the user comprises receiving transaction information comprising the image, and wherein the transaction information indicates a location where the image was captured.

19. The method of claim 11, wherein the geo-location comprises global positioning system (GPS) data.

20. A non-transitory machine-readable medium having stored thereon machine-readable instructions executable to cause a machine to perform operations comprising:
receiving an image of a payment instrument for a user, wherein the image comprises metadata for the image;
determining a geo-location of a user device for the user at a first time associated with capture of the image;
determining a second time associated with use of the image as the payment instrument;
determining that a difference between the second time and the first time matches a predetermined time difference value for allowable use of the payment instrument based on the metadata and the second time; and
assessing a validity of the use of the image as the payment instrument based on the metadata for the image and the geo-location.

\* \* \* \* \*